US012375610B1

(12) United States Patent
Swerdlow et al.

(10) Patent No.: US 12,375,610 B1
(45) Date of Patent: Jul. 29, 2025

(54) ACCENTUATING COMMUNICATIONS IN A VIDEO CONFERENCE

(71) Applicant: Zoom Communications, Inc., San Jose, CA (US)

(72) Inventors: Aleksandra Swerdlow, Santa Clara, CA (US); Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/451,582

(22) Filed: Aug. 17, 2023

Related U.S. Application Data

(63) Continuation of application No. 17/973,805, filed on Oct. 26, 2022, now abandoned.

(51) Int. Cl.
*G06F 3/048* (2013.01)
*H04L 65/403* (2022.01)
*H04M 3/56* (2006.01)

(52) U.S. Cl.
CPC .......... *H04M 3/568* (2013.01); *H04L 65/403* (2013.01)

(58) Field of Classification Search
CPC .............................. H04M 3/568; H04L 65/403
See application file for complete search history.

(56) References Cited

U.S. PATENT DOCUMENTS

| 7,865,834 | B1* | 1/2011 | van Os ..................... H04N 7/15 |
| | | | 715/756 |
| 8,232,962 | B2* | 7/2012 | Buck .................. G06Q 30/0201 |
| | | | 705/7.29 |
| 9,451,210 | B1 | 9/2016 | Smus |
| 10,572,005 | B2* | 2/2020 | Zahn ..................... G06F 1/1698 |
| 10,990,171 | B2* | 4/2021 | Sztuk ...................... G06F 3/011 |
| 11,287,884 | B2 | 3/2022 | Young et al. |
| 11,438,548 | B2 | 9/2022 | Eskafi et al. |
| 11,689,379 | B2* | 6/2023 | Daredia ................ G06F 16/345 |
| | | | 709/204 |
| 12,081,354 | B2* | 9/2024 | Yu .......................... H04W 4/025 |
| 2010/0315482 | A1* | 12/2010 | Rosenfeld ............. H04L 65/403 |
| | | | 348/E7.083 |
| 2021/0011607 | A1* | 1/2021 | Ziman ................... G06T 19/003 |
| 2021/0294413 | A1 | 9/2021 | Manduchi |
| 2021/0399911 | A1* | 12/2021 | Jorasch ............... H04L 12/1818 |
| 2021/0400142 | A1* | 12/2021 | Jorasch ............... H04L 65/1069 |
| 2022/0103963 | A1* | 3/2022 | Satongar ................ H04N 7/147 |
| 2022/0191515 | A1 | 6/2022 | Walters et al. |
| 2022/0286657 | A1 | 9/2022 | Oz et al. |

(Continued)

*Primary Examiner* — David Phantana-angkool
(74) *Attorney, Agent, or Firm* — Young Basile Hanlon & MacFarlane, P.C.

(57) ABSTRACT

Communications between participants of a video conference are accentuated based on a participant's focus. A first participant of a video conference is determined to be focused on a user interface element associated with a second participant of the video conference. Responsive to the determining that the first participant is focused on the user interface element associated with the second participant, relative audio levels of communications are changed for the second participant such that a first audio level for communications from the first participant to the second participant is higher than a second audio level for other communications received by the second participant.

20 Claims, 14 Drawing Sheets

(56) References Cited

U.S. PATENT DOCUMENTS

| | | | |
|---|---|---|---|
| 2023/0146178 A1* | 5/2023 | Haro | G06F 3/04847 |
| | | | 381/303 |
| 2024/0073608 A1* | 2/2024 | Haddad | H04R 3/005 |
| 2024/0211204 A1* | 6/2024 | Gatzke | G06F 3/165 |
| 2024/0259224 A1* | 8/2024 | Chau | H04L 12/1831 |

* cited by examiner

ACCENTUATING COMMUNICATIONS IN A VIDEO CONFERENCE

CROSS REFERENCES TO RELATED APPLICATIONS

This application is a continuation of U.S. patent application Ser. No. 17/973,805, filed Oct. 26, 2022, the entire disclosure of which is incorporated herein by reference.

FIELD

This disclosure relates generally to video conferencing, and, more specifically, to accentuating communications in a video conference based on a participant's focus.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
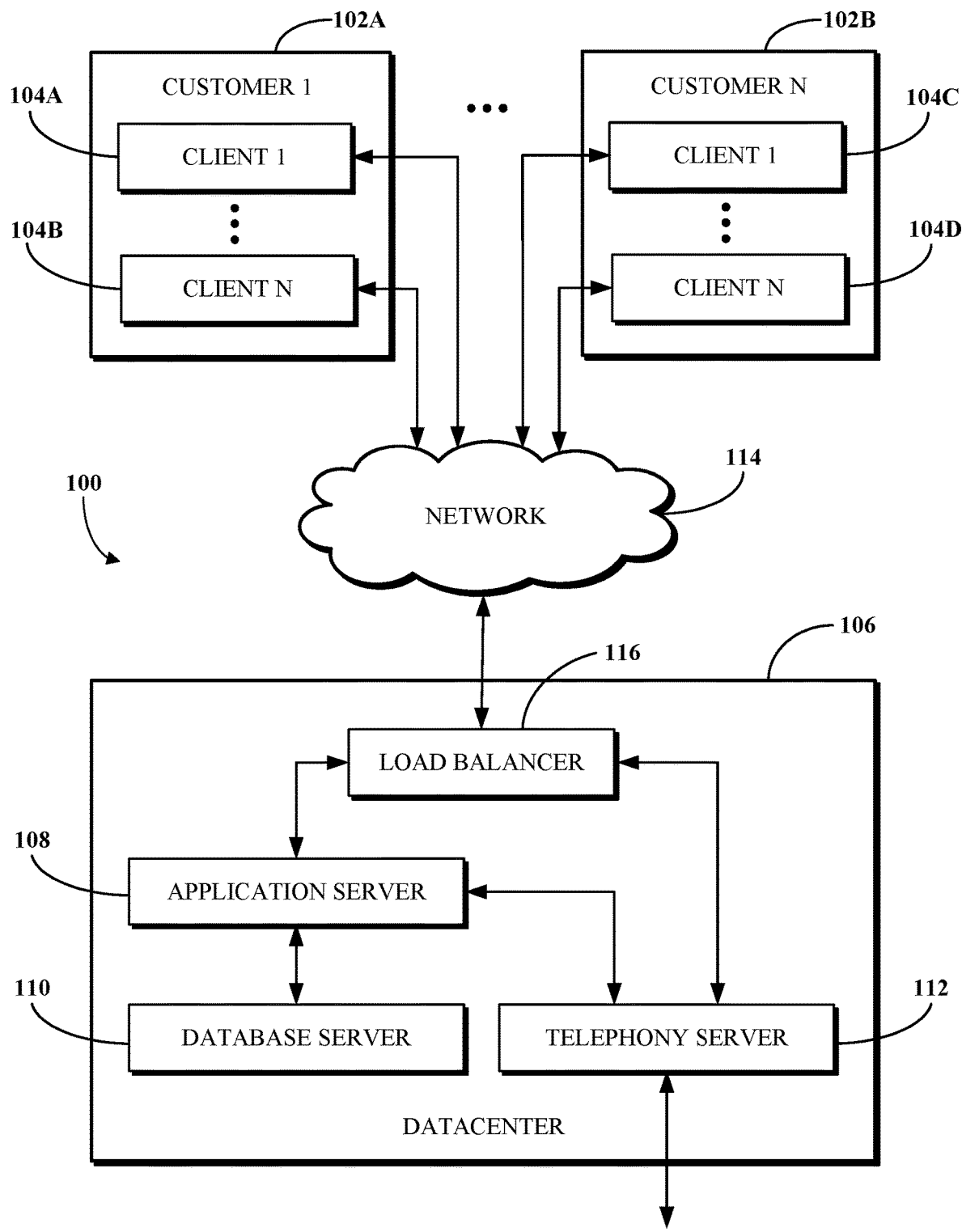
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of such a communications service, which may be implemented using a UCaaS platform or otherwise, is a video conferencing service that utilizes video conferencing software. Video conferencing software is frequently used across various industries to support video-enabled conferences between participants in multiple locations. In some cases, each of the conference participants separately connects to the video conferencing software from their own remote locations. In other cases, one or more of the conference participants may be physically located in and connect to the video conferencing software from a conference room or similar physical space (e.g., in an office setting) while other conference participants connect to the video conferencing software from one or more remote locations. Video conferencing software thus enables people to conduct video conferences emulating a traditional meeting experience without requiring them to be physically present with one another.

A video conference system and associated video conference software provide a GUI for participants interacting in the video conference. Participants in the video conference are referred to herein as either local participants or remote participants. The quality of a given participant being a local participant or a remote participant is with respect to a subject client device under discussion. In particular, a participant is referred to herein as a local participant when they are physically at a subject client device and viewing the GUI displayed at that client device, and thus when they are the or at least a user of the subject client device under discussion, regardless of whether they are represented in one or more user interface (UI) elements in the GUI. Similarly, a participant is referred to herein as a remote participant when they are not physically present at a subject client device but instead are represented within one or more UI elements in a GUI displayed at that client device. A participant is thus a local participant with respect to their client device and remote with respect to another participant's client device. The UI elements used to represent a participant can include tiles that depict a participant or a group of participants in the video conference.

When a local participant interacts with the video conference system to send audio communications, such as speech, the remote participants in the video conference, the speech is typically delivered to all the remote participants. In some cases, the speech may be specifically directed at a particular participant, such as where speech pertains to a subject specific to that particular participant. However, where speech is not clearly directed to a particular participant (e.g., where context makes it unclear to whom a question or comment is directed), it is often challenging for the remote participants to determine if the local participant is directing the speech to them or to a different remote participant. For example, when a first, local participant directs a question to a second, remote participant, the video conference system delivers the question to all the remote conference participants. There is not a way for the second, remote participant to recognize that the first, local participant directed the question to them unless the first, local participant specifically calls out the identity of the second, remote participant when asking the question. Video conference systems can display a user interface element associated with a speaking participant or enlarge the user interface elements when the participant speaks, but this only identifies who is speaking, not who the participant is speaking to. Thus, conventional video conference systems lack technical capabilities for a remote participant to be made aware that another participant is addressing them.

Implementations of this disclosure address problems such as these by accentuating communications in a video conference based on a participant's focus. According to the implementations of this disclosure, a video conference system includes a UI that enables the video conference system to determine when a local participant intends to direct speech toward a particular remote participant of a video conference. The video conference system determines that a local participant intends to direct communications to a particular remote participant by observing a focus of the local participant. When the video conference system observes that a local participant focuses on a UI element associated with a particular remote participant, the video conference system infers that the local participant intends to direct communications to the particular remote participant. Responsive to the determination that the local participant intends to direct the communications to a particular remote participant, the video conference system accentuates the communications for the particular remote participant by changing the relative audio level for communications for the particular remote participant such that a first audio level for communications from the local participant to the particular remote participant are higher than a second audio level for other communications received by the particular remote participant. Besides increasing the audio levels, a UI of the particular remote participant can present an alert indicating that the local participant is directing their speech to the particular remote participant. The alert can be a visual indication, such as an enlarged UI element associated with the local participant, an audible alert, and/or other type of notification. The video conference system can determine the focus of the local participant by tracking their eye gaze and identifying where the local participant is holding their eye gaze. When the local participant holds their eye gaze on a UI element associated with the particular remote participant, the video conference system infers that the local participant is focused on the UI element. To reduce unwanted focus alerts, the video conference system can prompt the local participant to confirm that they intend to direct their speech to the particular remote participant. In some instances, in place of eye gaze tracking, the local participant can manually indicate their focus by selecting a UI element using an input device, such as a mouse or touchscreen.

To describe some implementations in greater detail, reference is first made to examples of hardware and software structures used to implement a system for accentuating communications in a video conference based on a participant's focus. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or a combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs the same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs the same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
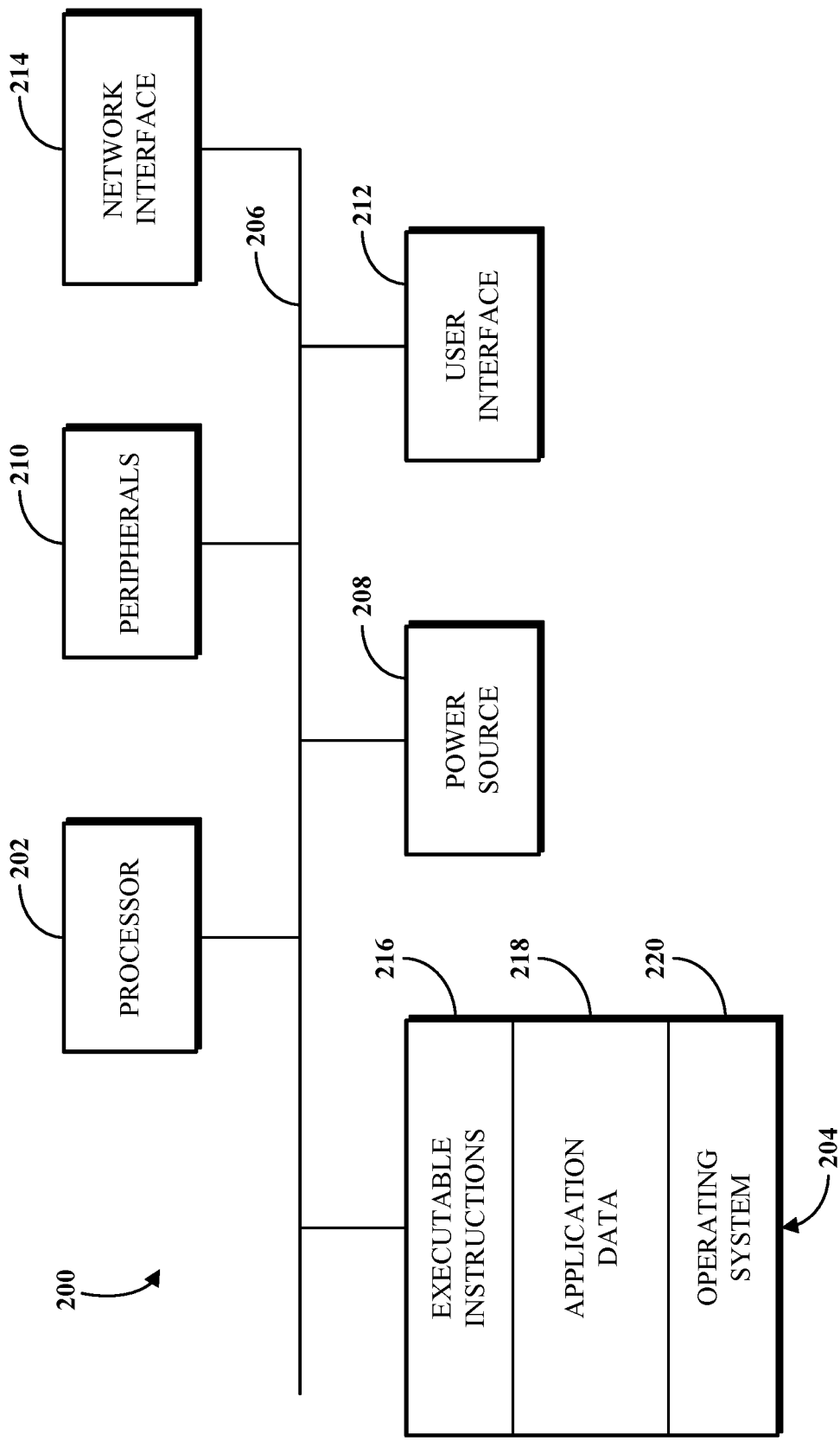
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a UI 212, a network interface 214, other suitable components, or a combination thereof. One or more of the memory 204, the power source 208, the peripherals 210, the UI 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 include one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The UI 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light-emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
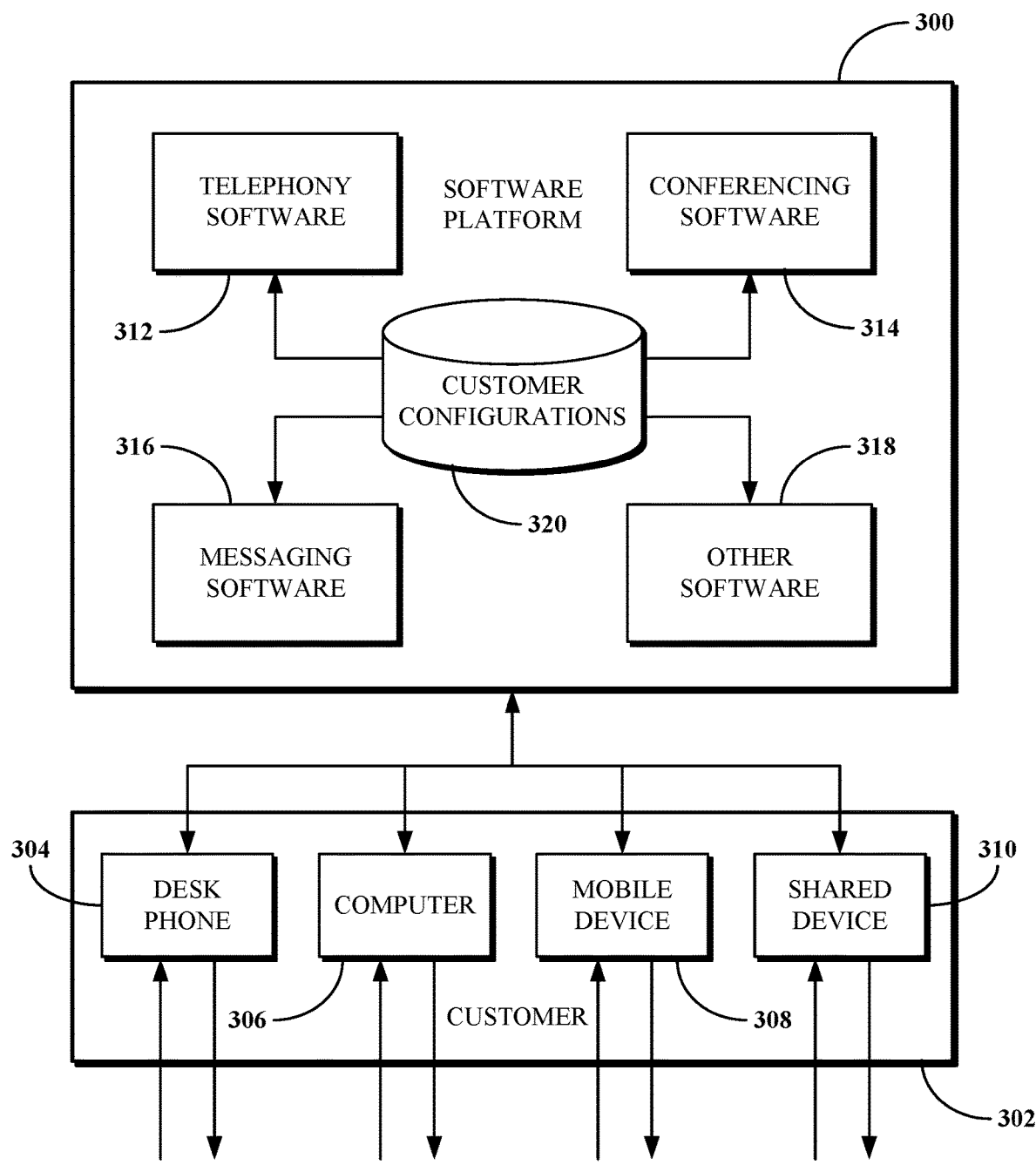
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)-a desk phone, a computer, a mobile device, and a shared device. The desk phone 304 is a desktop unit configured to at least send and receive calls and includes an input device for receiving a telephone number or extension to dial to and an output device for outputting audio and/or video for a call in progress. The computer is a desktop, laptop, or tablet computer, including an input device for receiving some form of user input and an output device for outputting information in an audio and/or visual format. The mobile device is a smartphone, wearable device, or other mobile computing aspect, including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device, which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging, which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for determining participant focus on UI elements during a video conference and for accentuating communications based on that participant focus.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a UI element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
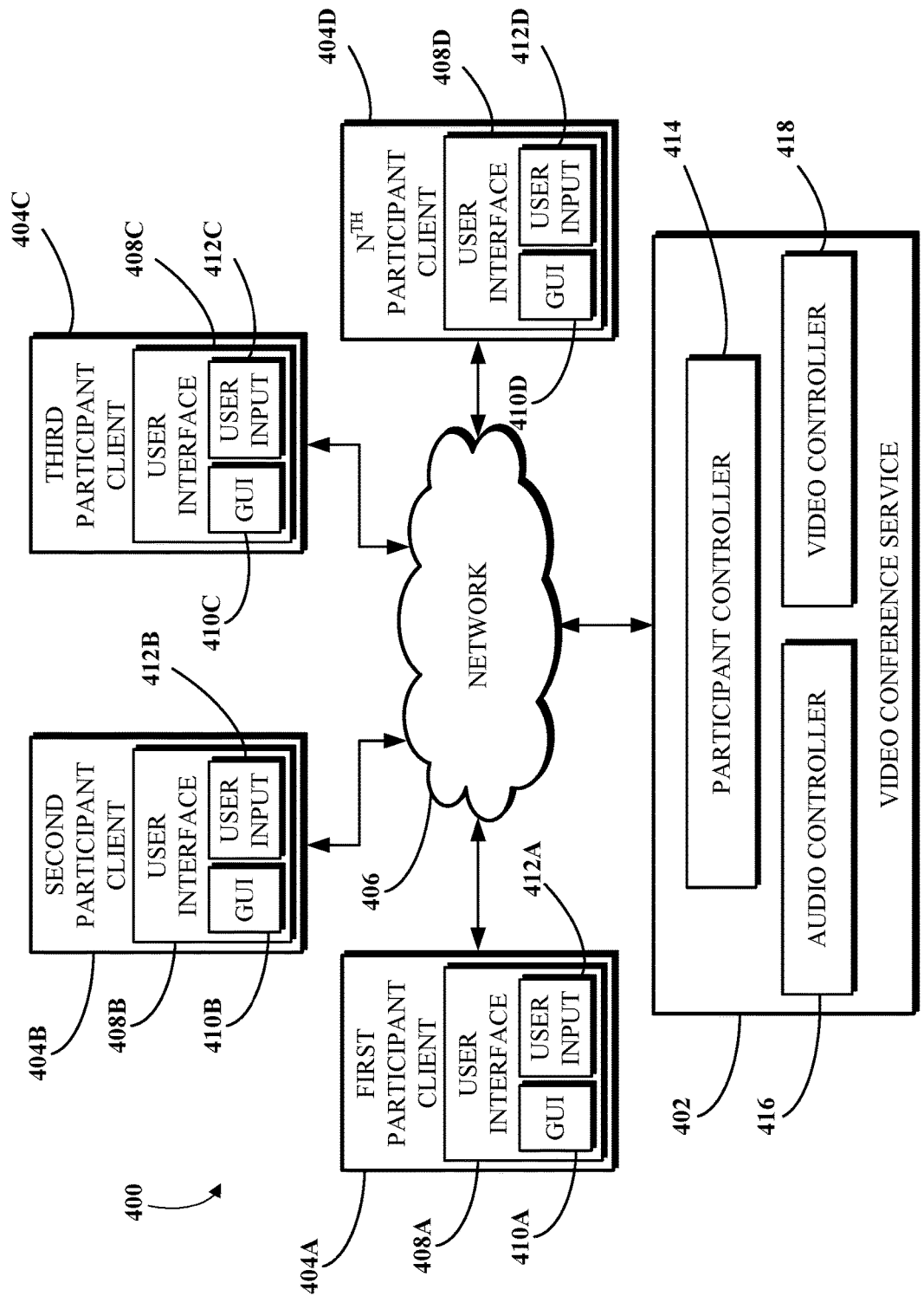
FIG. 4 is a block diagram of an example video conference system for accentuating communications in a video conference based on a participant's focus.

FIG. 4 is a block diagram of an example of a video conference system 400 that accentuates communications based on a participant's focus. As shown, the video conference system 400 includes a video conference service 402, clients 404A, 404B, 404C, 404D (referred to collectively and generically as a client 404), and a network 406 communicatively coupling the video conference service 402 and the clients 404. The clients 404 are each associated with a respective participant participating in a video conference provided by the video conference service 402. The described operations can be performed locally at a client 404 or can be performed by the video conference service 402 depending on the implementation of the video conference system 400. For example, in some instances a client 404 may have limited resources and be unable to implement some features locally. In such instances, the video conference service 402 can perform the feature for the client 404 as a service. Implementing the features at the video conference service 402 allows clients 404 that would otherwise be incompatible to participate in a video conference.

Each client 404 includes a respective UI 408A, 408B, 408C, 408D (referred to collectively and generically as a UI 408) of the video conferencing system 400. The clients 404 are implemented by computing devices and may, for example, be one of the clients 104A-B shown in FIG. 1 or one of the clients 304-310 shown in FIG. 3. For example, the UI 408 may be a display (or other visual output component) and a speaker (or other audio component) of the client 404. The UI 408 is configured to output media to a local participant, such as visual media including a GUI 410A, 410B, 410C, 410D (referred to collectively and generically as a GUI 410) and audio media and receive user input 412A, 412B, 412C, 412D (referred to collectively and generically as user input 412) from the local participant such as an audio input, a video input, and UI inputs.

As explained in more detail in relation to FIGS. 6-13, the GUI 410 outputs visual media such as video feeds from remote participants, shared visual content from remote participants, and UI elements that represent individual remote participants or groups of remote participants. Other UI elements can be present in the GUI 410 for interacting with the client 404 but will not be described in further detail. A UI element representing a single participant can display a graphic representing the single participant such as a picture of the single participant or an avatar of the single participant or the UI element can display a video, such as a live feed from the single participant. A UI element representing a group of participants can display a graphic representing the group of participants or can contain nested UI elements that represent single participants of the group of participants.

The user inputs 412 include user inputs such as mouse inputs, touch interface inputs, keyboard inputs, mouse inputs, or eye gaze tracking inputs. The user inputs 412 provide various functionality for interacting with the GUI and, more particularly, with respect to this disclosure, provide the video conference system 400 with information that the video conference system 400 uses to determine a local participant's focus within the GUI. As will be explained in greater detail, the video conference system 400 makes use of the local participant's focus within the GUI 410 to identify a remote participant that the local participant intends to direct a communication to and, in response, provide the video conferencing system 400 with information to accentuate communications from the local participant to a particular remote participant that the local participant is focused on.

Figure 5:
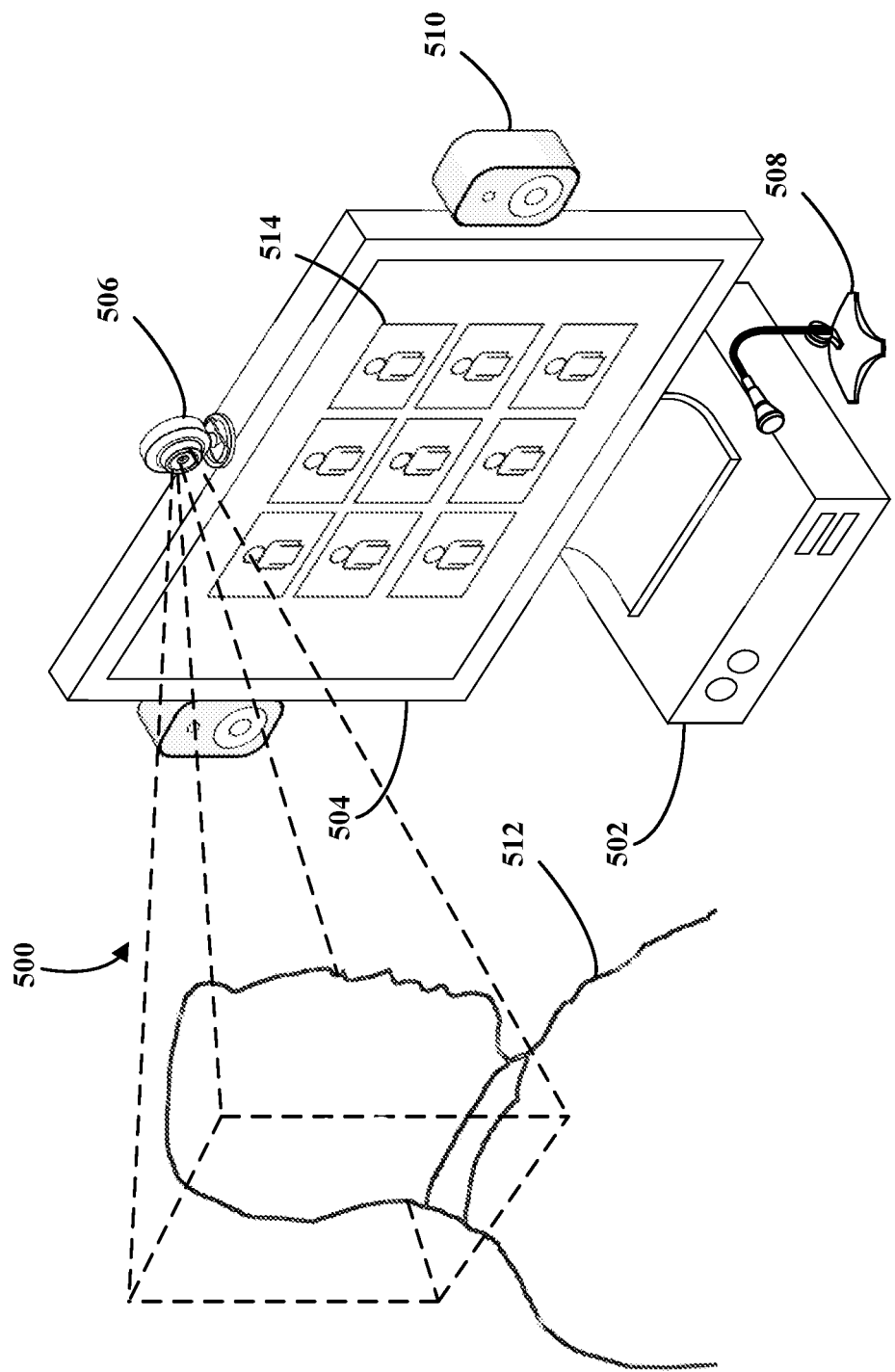
FIG. 5 is a view of an example of a client device configured to determine a participant's focus and accentuate communications in a video conference.

In some implementations, the video conference system 400 implements client-side processing for determining a participants focus, as described in greater detail in relation to FIG. 5. Furthermore, in some implementations, the client 404 is responsible for accentuating communications based on information received from the video conference service 402. In other implementations, the video conference service 402 is responsible for accentuating communications based on information received from the client device 404. In the following description of the video conference service 402, the various techniques are described in relation to the video conference service 402 performing the functions. However, in some implementations, the client can perform the techniques locally as described in relation to FIG. 5.

The video conference service 402 a service for delivering video conference functionality to the clients 404 and is implemented using hardware and software. The hardware may, for example, be or include one or more server devices, such as the application server 108 of FIG. 1. The software may, for example, be or include the conferencing software 314 of FIG. 3. To deliver video conference functionality to the clients 404, and thus to facilitate a video conference between participants using the clients 404, the video conference service 402 obtains media (e.g., video and/or audio streams) from each of the clients 404, centrally processes same (e.g., to normalize and/or encode the media), and thereafter delivers the processed media to each of the clients 404 for outputting at the UIs 408. The video conference service 402 includes participant controller services 414 configured to control the presentation of clients 404 within a video conference, audio controller services 416 configured to route audio media between the clients 404, and video controller services 418 configured to route visual media between the clients 404.

The participant controller service 414 controls the presentation of clients 404 within a video conference including authenticating clients 404 to ensure the participant associated with the client is allowed to participate in the video conference, enforce permissions for the video conference, and perform other participant management functions.

The audio controller service 416 routes audio data between the clients, including receiving audio data from a source client, determining a destination client or clients to send the audio data to, and transmitting the audio data to the destination clients.

In some instances, a source client transmits audio to all the other clients by default. For example, a first participant using the source client by default will transmit audio to all the participants of the video conference. The audio controller service 416 receives the audio from the source client, determines that the audio is default audio, and transmits the audio to all the other clients of the video conference. Each client 404 receives the audio and presents the audio according to local settings of a client device.

A second participant can use a second source client 404 to transmit different audio to the other participants. Like the routing of the audio of the first participant, the audio controller service 416 receives audio from the source client 404, determines that the audio is default audio, and transmits the audio to all the other clients 404 of the video conference. However, as part of transmitting the audio to all the other clients 404 of the video conference, the audio controller service can mix the audio of the first participant with the audio of the second participant to generate a single audio stream to transmit to the other clients 404. In some instances, the audio controller service 416 can adjust the relative levels of the audio sources to produce an audio stream having a consistent volume between audio sources.

The audio controller service 416 routes other audio differently depending on the preferences of a participant. For example, in some instances, a participant can direct audio to another participant. In such instances, the audio controller service 416 receives the audio, determines that the audio is intended for a particular participant, and transmits the audio to the particular participant. Such audio transmissions are private, in the sense that no other participants are able to hear the audio.

In another instance, a participant can direct speech to another participant but still transmit the audio of the speech to the entire group of participants. For example, in the middle of a discussion during a video conference, a participant can ask another participant a question, such as "What do you think?" The question is intended for a single participant or a group of participants, but it would not be appropriate for the question to be private, since it is a part of the larger group discussion. In such instances, the audio controller service is configured to accentuate the audio for the participant or group of participants that the participant is directing the question to. The audio controller service 416 can emphasize the audio for the participant or group of participants by increasing the relative volume of the audio relative to other audio in the video conference. The audio controller service 416 can continue to accentuate the audio until the video conference service determines that the participant is no longer focused on a UI element. In response to determining that a participant is no longer focused on the UI element, the video conference system can restore the relative audio levels for a participant to a level that existed prior to the participant began focusing on the UI element.

In some implementations, the audio controller service 416 can include control information with audio data indicating that the audio should be accentuated or that the audio is private. For example, in place of changing the relative volume of audio sources delivered to a particular client, the audio controller service 416 can embed information in an audio data stream indicating the relative volume for each audio source that a specific client should play the audio. In such examples, the video conference system 400 can transmit the same audio data stream to each client and the client is responsible for changing the relative audio source levels.

The video controller service 418 is configured to route video data between the clients, including receiving video data from a source client, determining a destination client or clients to send the video data to, and transmitting the video data to the destination clients. In some instances, the video controller service 418 can embed information in a video data stream identifying the source of the video and how it should be handled by the receiving client 404. For example, if a video stream is associated with speech that is directed to another participant and should be accentuated, the video controller service 418 can include data, such as a tag, in the video data stream for the respective client to accentuate the audio.

Although the participant controller service 414, audio controller service 416, and video controller service 418 are shown in FIG. 4 as separate services, in some implementations the respective functions of the services can be integrated as a one or more services. For example, the audio controller service 416 and the video controller service 418 could be combined into a single audio-visual controller service. Furthermore, in some implementations, the described functions may be carried out by component other than the described services. For instance, in some implementations, the described functions can be implemented by client-side software. Or, in other implementations, the described functions can be implemented by a combination of client-side software and the video conference service.

FIG. 5 is an example of a client device 500 configured to implement a video conference client, such as one of the clients 404 of FIG. 4, that determines a focus of a local participant 512 and is suitable for use in a video conference system that accentuates communications based on a participant focus, such as the video conference system 400 of FIG. 4. The client device 500 can be a computing device 200 as described in the relation to FIG. 2. The client device 500 includes a processing unit 502 including a processor (not shown) configured to execute instructions and memory (not shown) configured to store the instructions, a display 504 configured to display a GUI 514 of a video conference, a camera 506 configured to capture images of the local participant 512 using the client device 500, a microphone 508 configured to capture audio of the local participant 512, and speakers 510 configured to output audio of the video conference to the local participant 512. The client device 500 can include other components not shown in FIG. 5 such as a keyboard, a mouse, a headset, a network interface, and other components for interacting with the client device 500.

The memory stores and the processing unit executes instructions configured to implement a video conference client including instructions for presenting the GUI 514 at the display 504, controlling the level of audio signals sent to the speakers 510, receiving image data from the camera 506, audio data from the microphone 508, and other user input from input devices, and determining the focus of the local participant 512. In some implementations, the memory also stores, and the processing unit executes instructions configured to modify the relative audio levels output to the local participant 512 for the remote participants dependent on whether a remote participant is focused on the local participant 512. In some implementations, the client device 500 may adjust relative audio levels of remote participants and not include functionality for determining the local participant's focus. For example, a client device 500 may lack an input device suitable for determining the local participant's focus but can still receive audio that is accentuated dependent on a participants focus. Or, in another implementation, the client device 500 may determine the participant's focus, but not implement adjusting relative audio levels. For example, a client device 500 may be a part of a video conference system that utilizes a video conference service that is responsible for changing relative audio levels prior to delivering the audio to the client device 500.

FIGS. 6-13 and the accompanying descriptions illustrate the GUI 514 in greater detail, but, as an overview, the GUI 514 is configured to display UI elements (see FIGS. 6-13) associated with remote participants of the video conference. In some instances, the GUI 514 can display a UI element associated with the local participant 512 in addition to the UI elements associated with the remote participants.

The processing unit 502 can vary the level of the audio signals corresponding to remote participants for output by the speakers 510 or other audio device. In some implementations, the processing unit 502 can automatically adjust the audio level corresponding to audio of a remote participant. In some instances, the processing unit 502 automatically adjusts the audio level during ordinary usage to normalize the audio levels. Thus, in such instances, the client device 500 outputs a consistent audio level corresponding to the audio of the remote participants, even when the remote participants speak at different loudness levels. Additionally, the processing unit 502 can adjust the relative audio levels corresponding to the audio of the remote participants to accentuate the audio of a particular remote participant. The accentuation can include increasing the audio level corresponding to audio of the particular remote participant while keeping other audio levels consistent, by decreasing the audio level of the other audio levels while keeping the audio level corresponding to the particular remote participant's audio level the same, or a combination of increasing the audio level corresponding to the particular remote while lowering the other audio levels. The processing unit 502 can determine to change the relative audio levels in response to the video conference system determining that the particular remote participant is focused on the local participant. In some instances, the processing unit 502 receives information from the video conference service indicating how the levels should be adjusted. In other instances, the audio levels may be adjusted prior to the processing unit 502 receiving the audio signals.

The processing unit 502 is configured to receive user input from user input devices and control aspects of the video conference based on the user input. For instance, the processing unit 502 can receive user input data in the form of image data from the camera 506, audio data from the microphone 508, text data from a keyboard (not shown), and selection data from a mouse (not shown) and process the user input data to send multimedia data to the remote participants. Furthermore, the processing unit 502 is configured to make use of the user input data to determine a focus of the local participant. When the processing unit 502 determines that the local participant is focused on a UI element corresponding to a particular remote user, the processing unit 502 can send information indicating the local participant is focused on the particular user to the video conference service for further processing.

In some implementations, the client device 500 utilizes a video stream from the camera 506 to determine the focus of the local participant 512. The client device 500 can implement eye gaze tracking using the camera 506 to determine a particular area of the display 504 that the local participant is focused on. Based on the determination of the particular area of the display 504 the local participant is focused on, the client device 500 can determine a particular UI element the local participant 512 is focused on. For example, a spatial mapping of UI elements depicting the various participants of the video conference may be obtained, generated, or otherwise determined and used to determine the particular UI element based on the eye gaze of the local participant 512. In such implementations, the client device 500 can take into account such factors as the size of the UI element relative to the size of the particular area, the amount of time the local participant 512 has their eye gaze fixed on the UI element, or past interactions between the local participant 512 and the remote participant associated with the particular UI element before determining that the local participant 512 is focused on the particular UI element.

In some implementations, the client device 500 implements video-based eye tracking locally using a video stream from camera 506 to track the eye gaze of the local participant. In other implementations, the video conference service can implement video-based eye tracking based on a video received from the client device. In either instance, the video-base eye tracking can be implemented by analyzing a video stream provided by the camera 506 that focuses on one or both eyes and captures eye movements as the local participant 512 views the display 504. To enhance the video-based eye tracking, the client device 500 can further include an infrared/near-infrared non-collimated light source (not shown) to create corneal reflections of the local participant. A vector between the center of the local participant's eye and the corneal reflection can be used to determine the direction of the local participant's eye gaze. The client device 500, or the video conference service, can determine a scan path of the local participant's eye gaze, including information such as whether the direction of the eye gaze is paused or moving. A smooth scanpath can indicate that the local participant 512 is tracking an object, a steady scanpath can indicate that the local participant 512 is focused in a particular direction, while a rapidly changing scanpath can indicate that the local participant 512 is not focused on any particular UI element.

In some implementations, the client device 500 determines the focus of the local participant 512 using an input device such as a mouse, keyboard, or trackpad. In such implementations, the local participant 512 can use the input device to manually select a UI element to indicate that they are focused on a remote participant corresponding to the selected UI element. For example, the local participant 512 may use a pointing device such as a mouse to place their cursor over the UI element, use a touch screen to registers a selection of the UI element, or use the keyboard to arrow through the UI elements.

To reduce the risk of false determinations of a participant's focus, in some implementations, the client device 500 can prompt the local participant 512 to confirm that they are focusing on a particular remote participant. For example, the GUI 514 may output a confirmation button for the local participant 512 to select, confirming that they are focused on the identified UI element.

In some implementations, the video conference system can use past interactions of the local participant 512 to bias the determination of the local participant's focus. For example, the video conference system can track how often participants interact relative to other participants of the video conference system. Participants that interact frequently may be more likely to direct speech to one another and, as a result, the video conference system can bias the focus detection. The video conference system can bias the focus detection by reducing the amount of time the local participant 512 needs to focus on a UI element before inferring that the local participant 512 is directing speech to the participant associated with the UI element, by enlarging the area around the UI element used to determine the local participant's focus or using other techniques.

Figure 6:
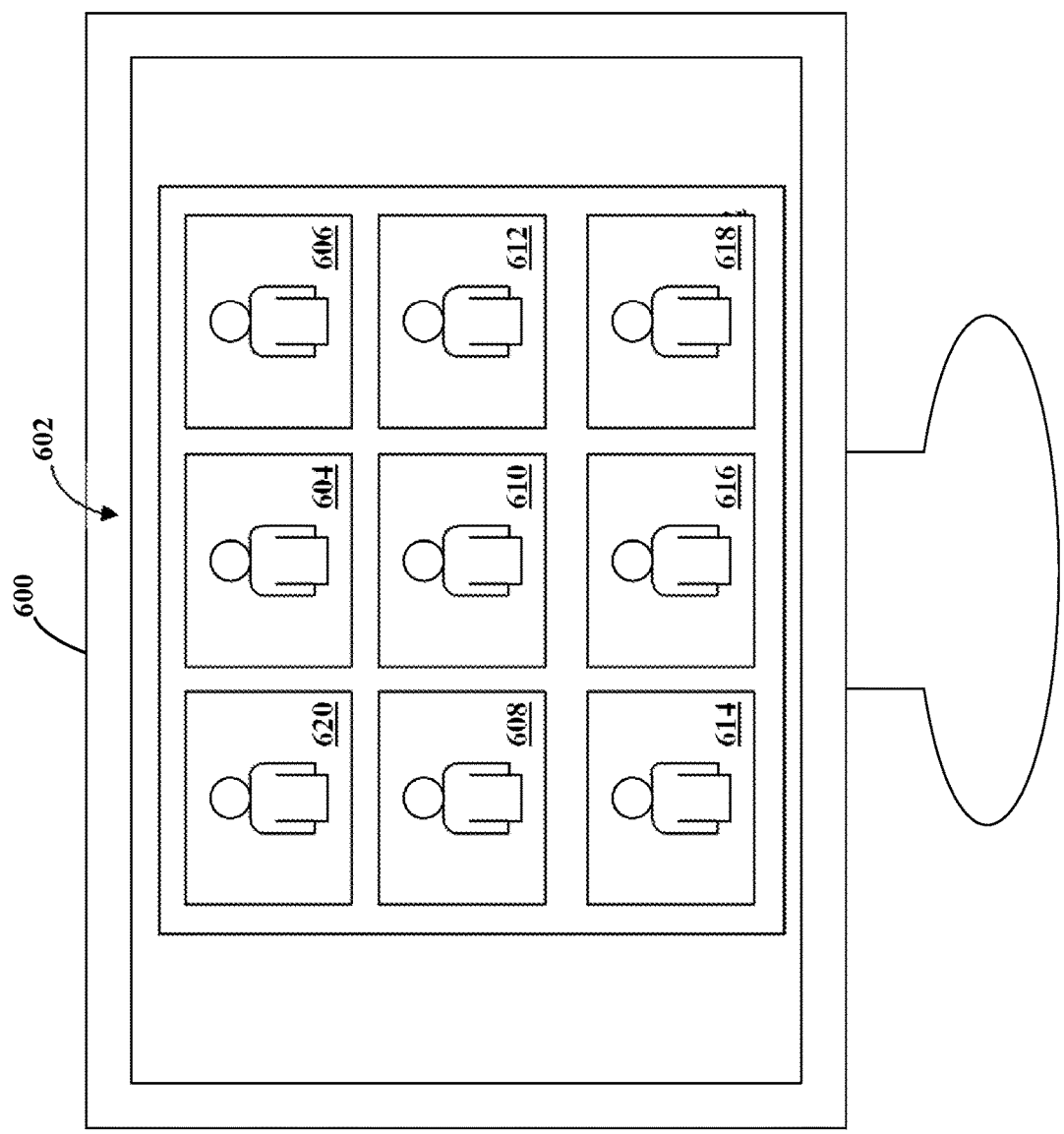
FIGS. 6-13 are example graphical user interfaces (GUIs) for clients in a video conference system.

FIGS. 6-13, as described above, are example GUIs for clients in a video conference system that accentuates communications based on a participant's focus. FIG. 6 is an example of a display 600 displaying a video conference GUI 602 to a local participant for a video conference having nine participants with eight remote participants represented by UI elements 604-618 and the local participant represented by UI element 620. The video conference GUI 602 as shown in FIG. 6 represents a default state in which a UI element 604-620 associated with each participant is presented similarly in the GUI 602. In this default state, audio from the participants is not accentuated, meaning that no processing is done by the video conference system to accentuate any particular audio. This default state can occur when participant focus detection is not being implemented or when no participant is identified as being focused on a UI element associated with another participant.

Figure 7:
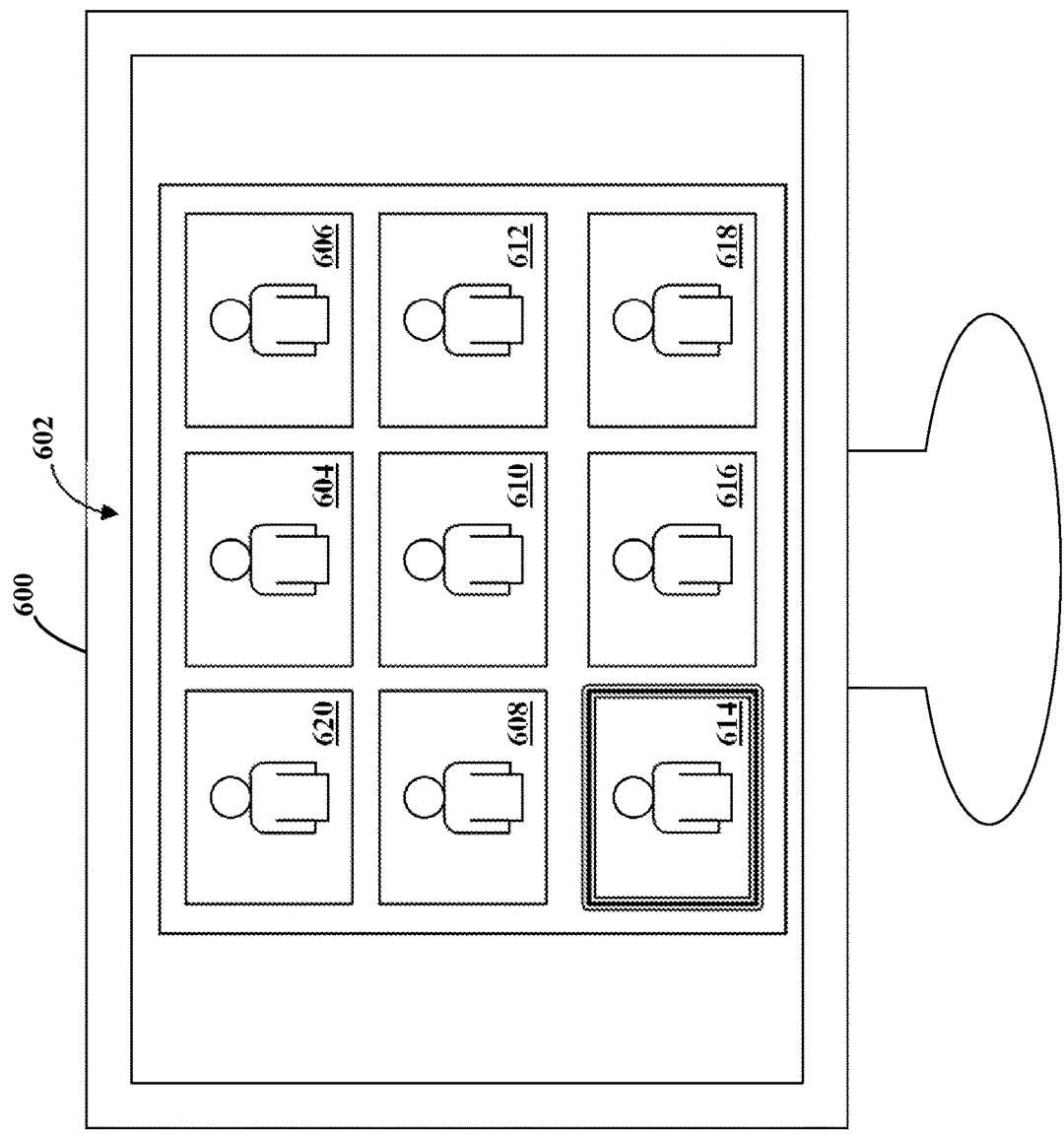

FIG. 7 is an example of the GUI 602 in which the local participant is focused on a particular UI element such as the UI element 614. The video conference system can determine that the local participant is focused on a UI element 614 using the previously described techniques, such as eye gaze tracking or a manual user input. In this example, the GUI 602 modifies UI element 614 to indicate to the local participant that the video conference system has determined that the local participant is focused on the UI element 614. This particular example modifies the UI element 614 by altering the border, but other modifications are possible. For instance, the GUI 602 can dim the other UI elements 604-612 (e.g., UI elements 604, 606, 608, 610, 612) and 616-620 (e.g., UI elements 616, 618, 620) or brighten the UI element 614 being focused on. In other implementations, there may be no indication to the local participant that the video conference system has determined that they are focused on a particular UI element.

Figure 8:
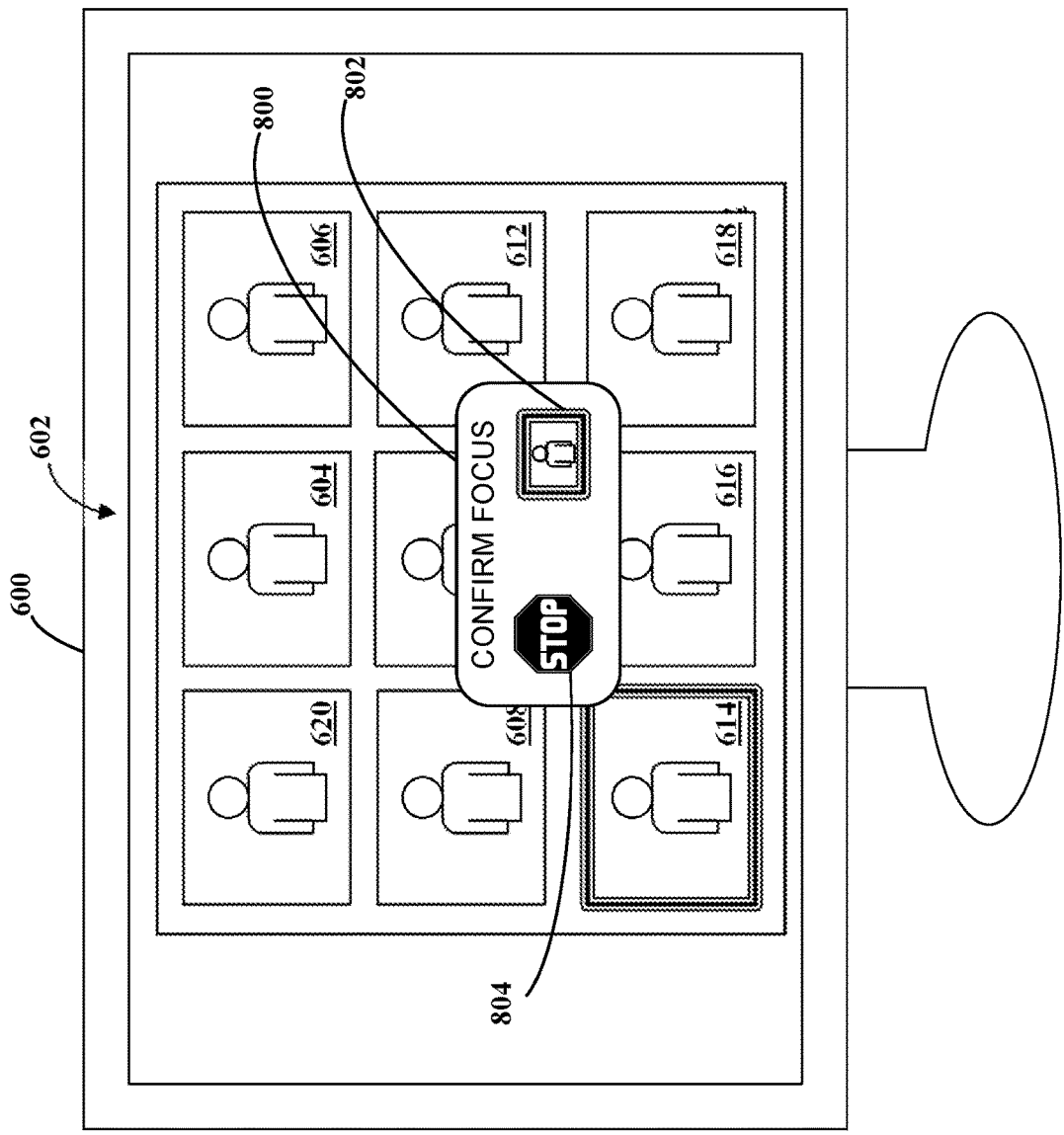

FIG. 8 is an example of the GUI 602 in which a UI prompt 800 is presented for the local participant to confirm that they are focused on the UI element 614. For example, the video conference system can determine that the local participant is focused on the UI element 614 using the previously described techniques. Before the video conference system accentuates the communication from the local participant to the remote participant associated with the UI element 614, the video conference system can require the local participant to select an icon 802 representing the UI element 614. If the local participant does not select the icon 802 representing UI element 614, or if the local participant selects the stop icon 804 instead, the video conference system does not accentuate the communications from the local participant to the remote participant associated with the UI element 614.

Figure 9:
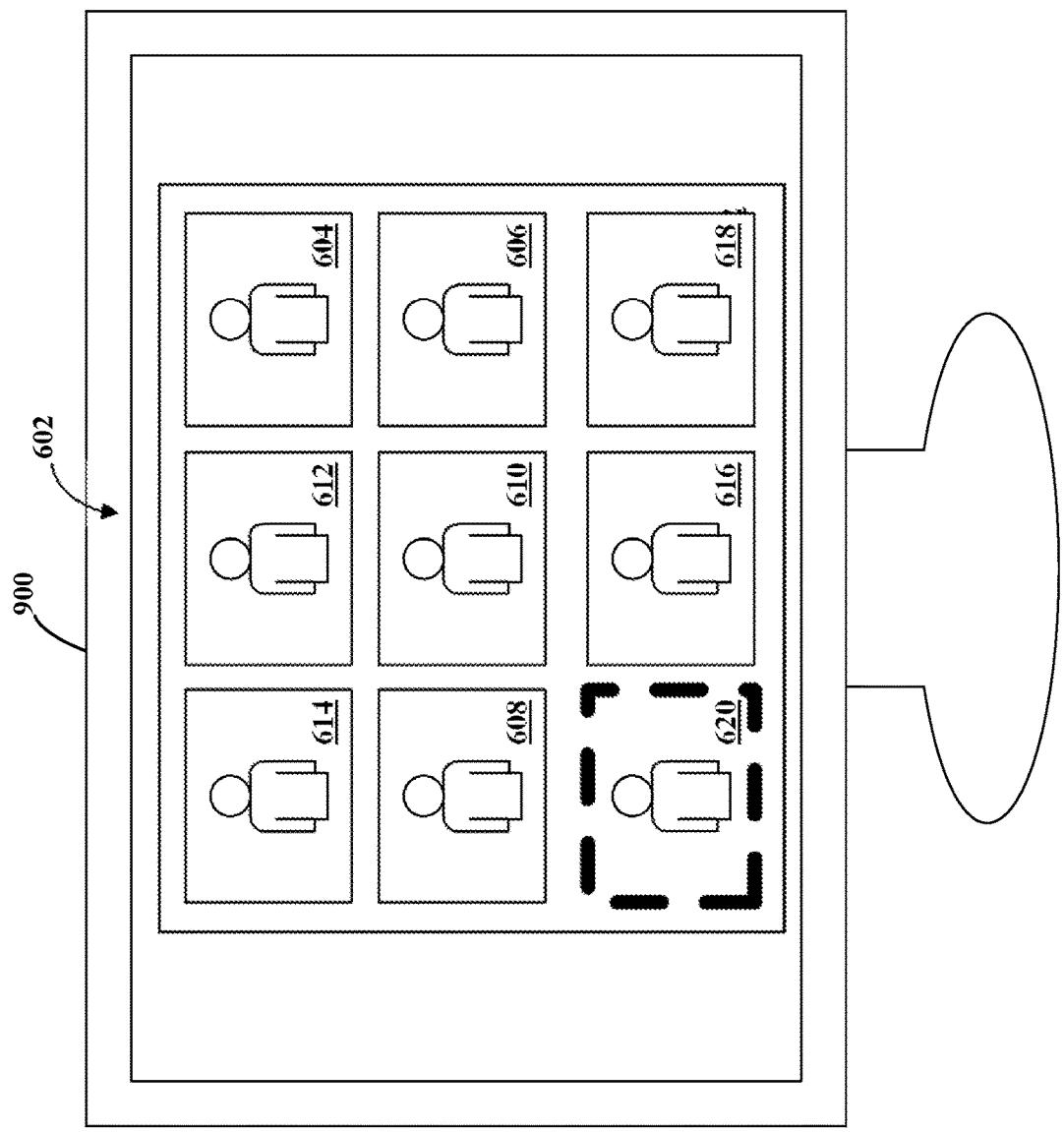

FIG. 9 is an example of the GUI 602 as displayed at a display 900 as viewed by a participant at a client device associated with the UI element 614. The general appearance of the GUI 602 resembles the GUI 602 as displayed in FIGS. 6-8, with the exception that the UI elements 604-620 are not all in the same locations as shown in FIGS. 6-8. For example, UI element 614 was located in the lower left-hand corner of the display 900 in FIGS. 6-8 but is now displayed in the upper left-hand corner of the display 900. In some instances, the UI element 614 associated with the client device displaying the GUI 602 can be located in a standard location. Thus, in the examples of FIG. 6-8, UI element 620 associated with the local participant was displayed in the upper left-hand corner of the GUI 602, whereas in the GUI 602 in the state of FIG. 9 the participant associated with UI element 620 is no longer local to the client device and the client device now displays UI element 614 in the upper left-hand corner of the display 900, indicating that they are the local participant. In other instances, the placement of a UI element can be unrelated as to whether a participant is a local participant. In still other instances, the local participant may not have a UI element associated with themselves displayed at the local display 900.

As described in relation to FIGS. 6-8, the video conference system has determined that I focus the participant associated with UI element 620 on UI element 614. In response, the video conference system changes the relative audio levels at the client device of the participant associated with UI element 614 such that an audio level for communications from the participant associated with UI element 620 is higher than a second audio level for other communications received by the participant associated with UI element 614. The audio levels for the remaining participants remain unchanged since the participant associated with the UI element 620 is not focused on them.

Because the audio levels are changed for communications from the participant associated with the UI element 620 to the participant associated with the UI element 614 and not the other participants, the participant associated with the UI element 614 can ascertain that the participant associated with the UI element 620 is directing their communication to them and not the other users. Furthermore, since the audio levels at the other client devices remain unchanged, the other participants are still able to hear the audio from the participant associated with the UI element 614. For example, if the participant associated with the UI element 620 is directing a question to the participant associated with the UI element 614, other participants such as the participant associated with the UI element 612 will still hear the question. Thus, when the participant associated with the UI element 614 responds, the other participants, such as the participant associated with the UI element 612 will know the context of their response and what question they are answering.

In some implementations, in addition to accentuating the audio at the client device associated with the UI element 614, the video conference system can additionally deemphasize the audio for the other participants. For example, the client device associated with the UI element 612 may reduce the relative volume of audio from the participant associated with interface element 620 when the participant is directing speech to a different participant, such as the participant associated with the UI element 614. Thus, the participants that the speech is not directed to can still hear the audio, but the reduced audio level informs them that the speech is not directed to them.

In addition to accentuating the communications by increasing the relative volume, the video conference system can indicate that a participant is directing a communication to another participant using visual cues. For example, in FIG. 9 the UI element 620 associated with the participant directing speech to the participant associated with UI element 614 is shown with a dashed border, indicating that the communication from the participant associated with UI element 620 is directed to the participant associated with UI element 614. To avoid confusion, the visual cue can be selected to be specific to directed communications. For example, the dashed border of FIG. 9 is visually distinct from the enlarged border shown in FIG. 8. Thus, the different visual cues provide different information to a participant.

Figure 10:
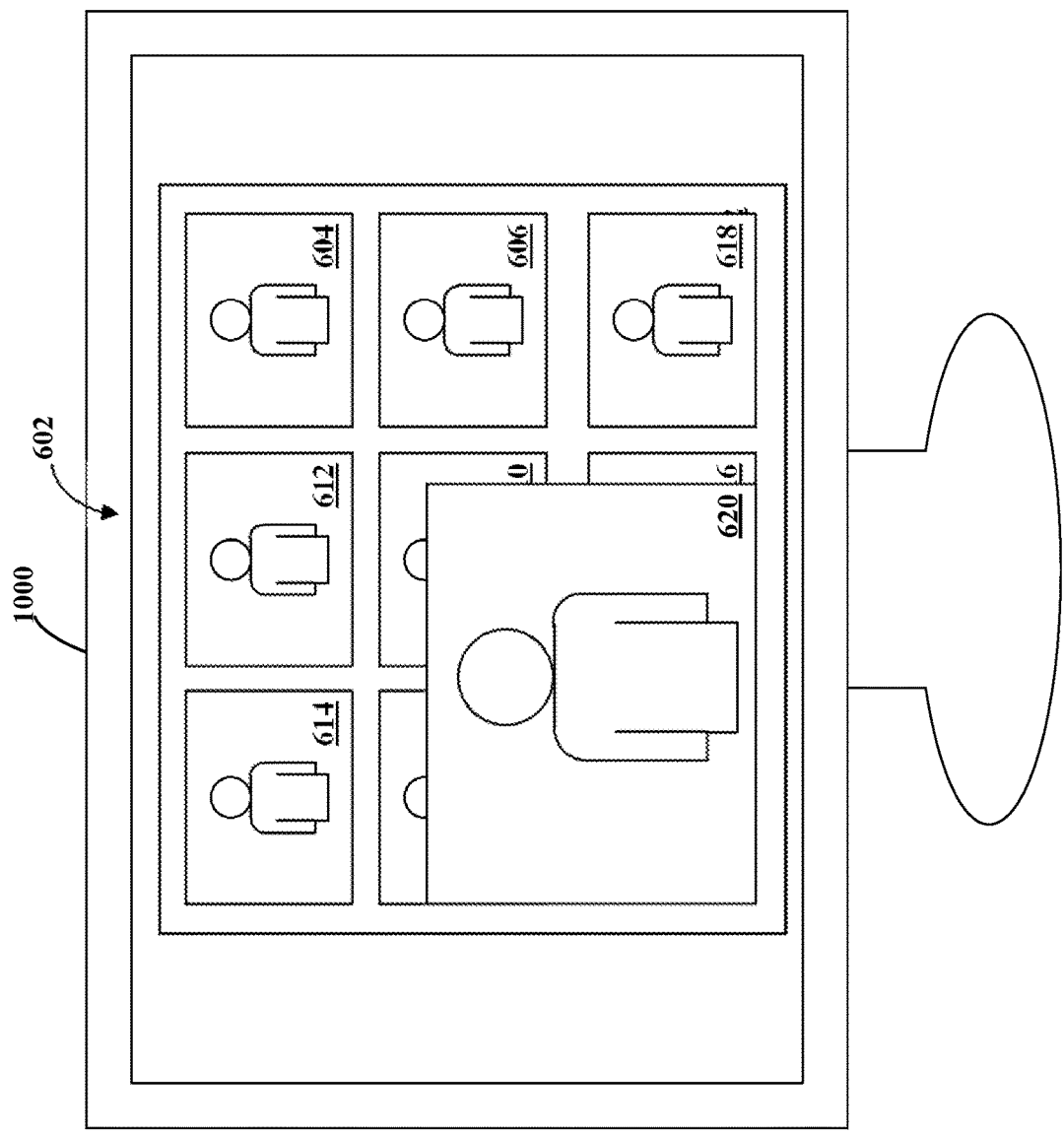

FIG. 10 is an example of the GUI 602 as displayed at a display 1000 as viewed by a participant associated with the UI element 614. In this example, the GUI 602 provides a visual cue to the participant associated with the UI element 614 that the participant associated with the UI element 620 is directing a communication to them by enlarging the UI element 620. Thus, in this example, the participant associated with the UI element 614 can discern that the participant associated with the UI element 620 is directing a communication to them based on the enlarged UI element 620.

In some examples, the GUI 602 does not provide a visual cue to a local participant that a remote participant is focused on their UI element until the remote participant begins to communicate. In such examples, the video conference system can cause a UI element to change only after determining that a participant is both focused on a UI element and is speaking. In other words, a participant can focus on a UI element without the video conference system notifying the participant associated with the UI element the participant is focused on. It is only when the participant focused on the UI element begins communicating that the remote participant is made aware of the participant's focus through the accentuated communications including altered sound levels, an altered UI element, or both a modified sound level and an altered UI element.

Figure 11:
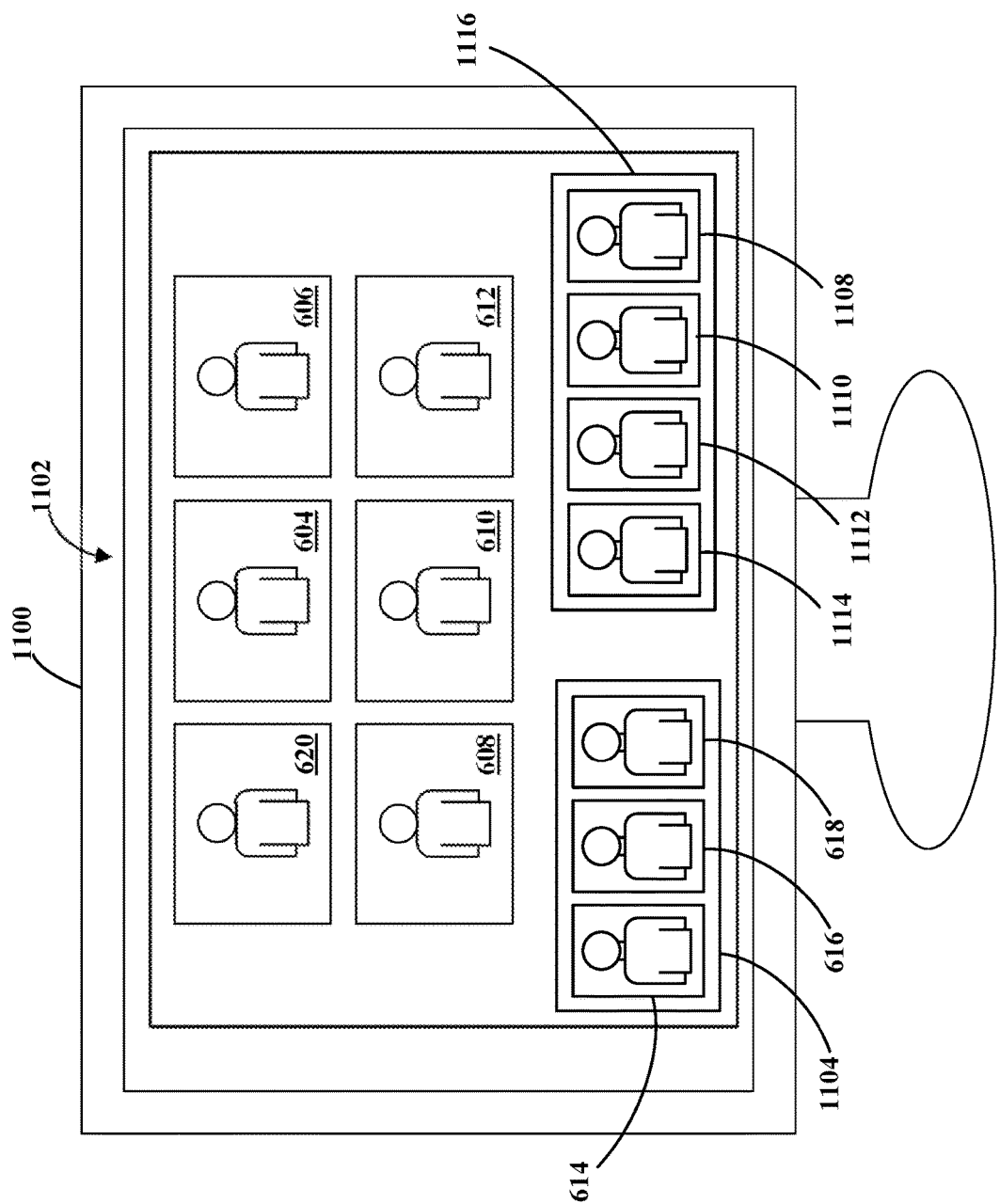

FIG. 11 is an example of a GUI 1102 as displayed at a display 1100 as seen at a client device such as the client device associated with the UI element 620. In this example, some of the remote participants are arranged into a first group 1104 and a second group and 1116. For example, remote participants associated with UI elements 614-618 are in the first group 1104 and remote participants associated with UI elements 1108-1114 are in the second group 1116. In this example, the local participant's focus may be on one of the groups 1104, 1116 of participants rather than a single UI element. The video conference system can determine the focus of the remote participant using the previously described techniques, with the exception that the focus of the local participant can be on a group of participants.

In response to the local participant being focused on a group of participants, the video conference system accentuates communications from the local participant to the group of participants associated with the UI element. For instance, if the video conference system were to determine that the local participant is focused on the second group 1116, the video conference system would accentuate communications from the local participant to the remote participants associated with UI elements 1108, 1110, 1112, 1114. The video conference system can accentuate the communications using the previously described techniques with the exception that multiple remote participants can have their audio levels adjusted or be provided with visual cues. The video conference system does not accentuate the communications for the other remote participants who are not a part of the group that the local participant is focused on.

Figure 12:
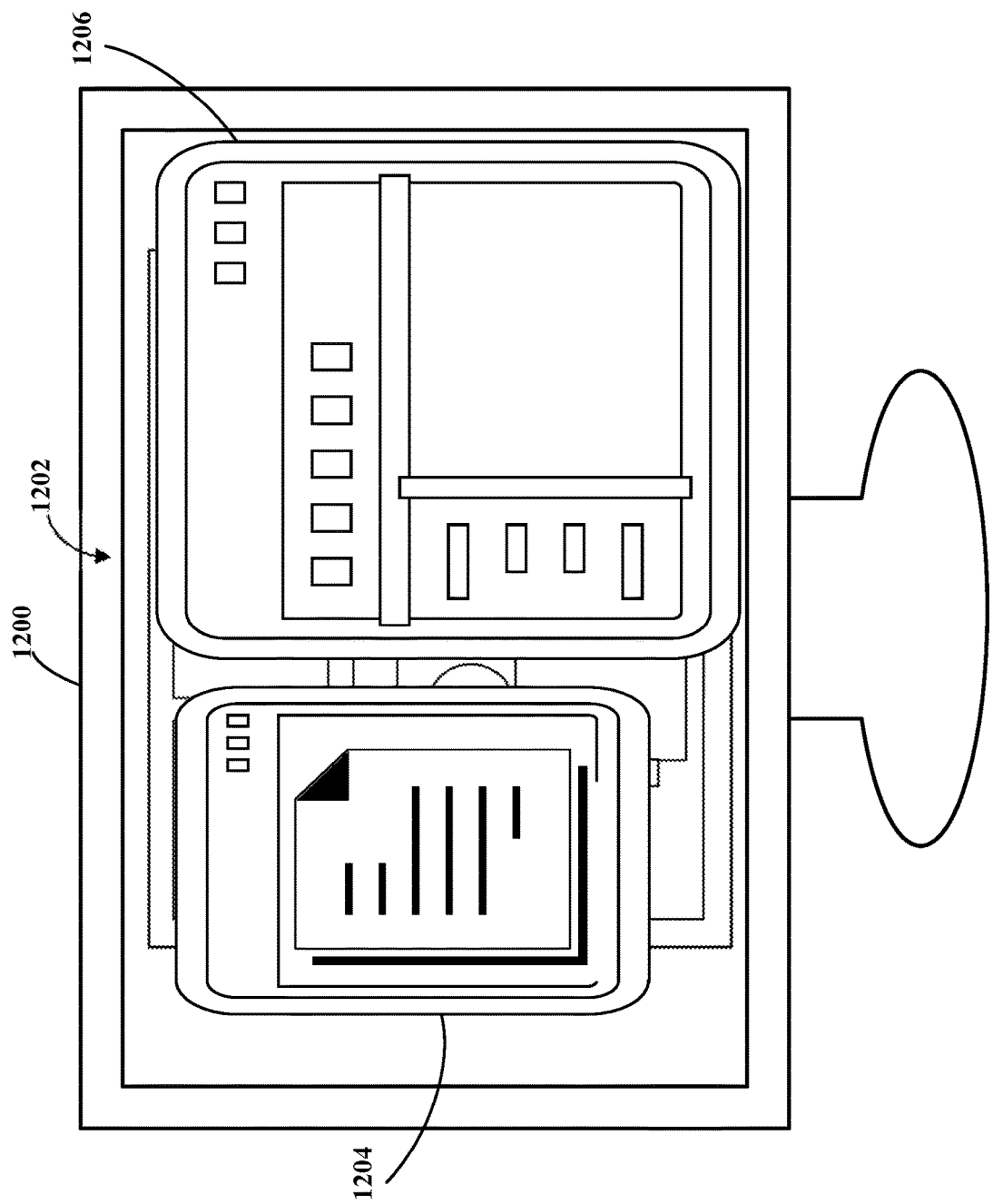

FIG. 12 is an example of a GUI 1202 as displayed at a display 1200 and as seen at a client device such as the client device associated with UI element 614. In this example, the GUI 1202 of the client device is displaying a text composing application 1204 and a time management application 1206 in windows that cover the UI elements of the video conference GUI. In some instances, a participant may perform other tasks during a video conference and as a result, the user elements of the video conference can become covered by other windows as shown in FIG. 12. The participant is still able to listen to the video conference since the windows do not affect the audio. In such instances, it is important for a participant to know if a communication is being directed to them since they do not have any visual context and may not being following along with the conversation.

Figure 13:
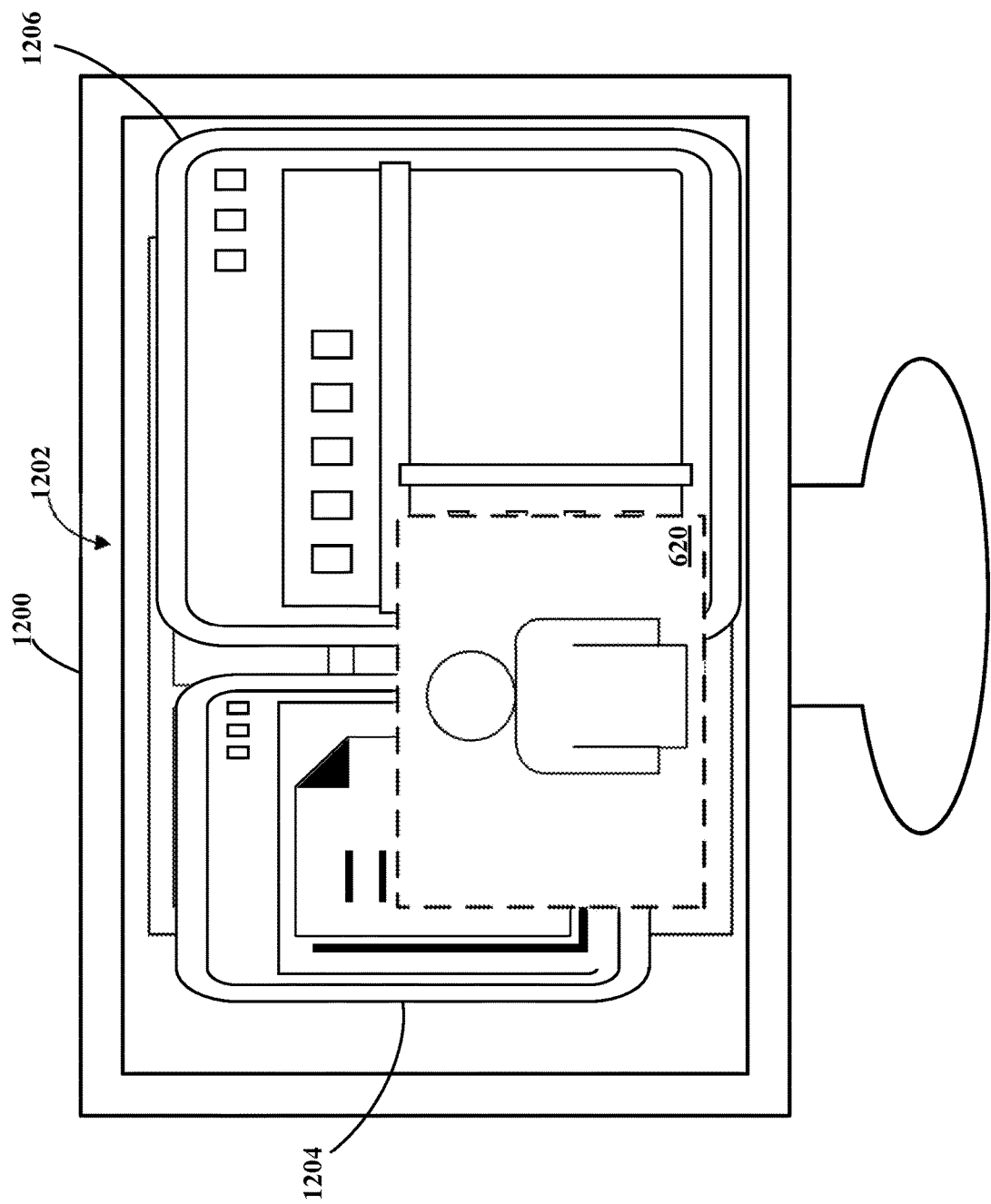

FIG. 13 is an example of the GUI 1202 of FIG. 12 accentuating a communication from the participant associated with the UI element 620. The video conference system can accentuate the audio as a result of determining that the participant associated with the UI element 620 is focused on UI element of the participant viewing the display 1200. The video conference system transitions the UI element 620 from a background UI element as shown in FIG. 12 to a foreground UI element of the GUI 1202 to indicate to the local participant that the participant associated with the UI element 620 is directing speech to them. The video conference system may perform other previously described techniques to accentuate the communication such as adjusting the relative audio levels or changing the appearance of the UI element 620. Thus, the video conference system enables a participant to discern that the participant associated with the UI element 620 is directing speech to them even if they are not actively participating in the video conference.

Figure 14:
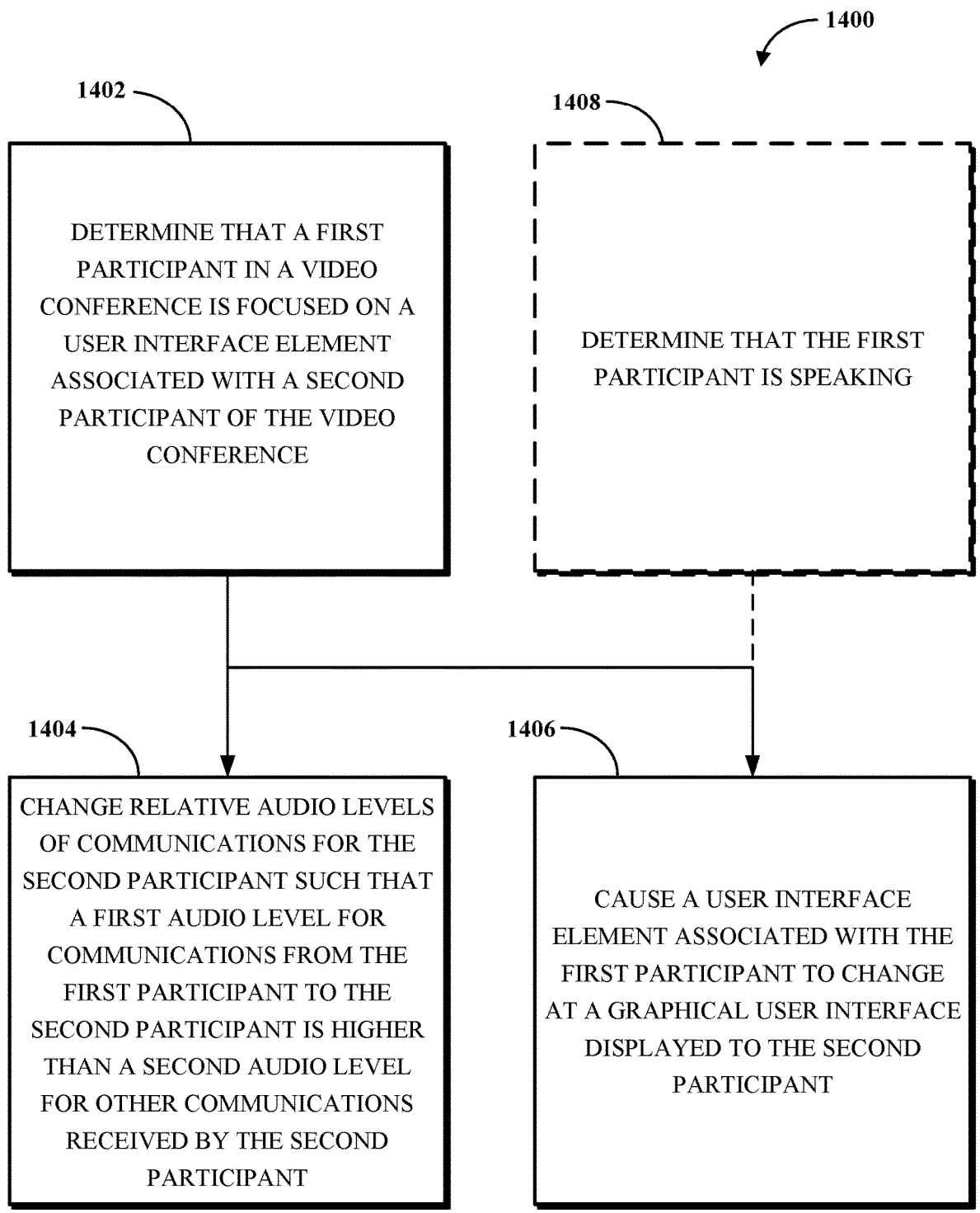
FIG. 14 is a flowchart of an example of a technique for accentuating communications in a video conference based on a participant's focus.

To further describe some implementations in greater detail, reference is next made to examples of techniques for accentuating communications in a video conference based on a participant's focus which may be performed by or using a video conference system. FIG. 14 is a flowchart of an example of a technique 1400 for accentuating communications in a video conference based on a participant's focus. In particular, the technique 1400 may be performed for determining a first video conference participant is focused on a UI element associated with a second video conference participant and, in response, accentuating communications from the first video conference participant to the second video conference participant by increasing the relative volume of the communications. The technique 1400 can be executed using computing devices, such as the systems, hardware, and software described with respect to FIGS. 1-13. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1402, the technique 1400 includes determining that a first participant of a video conference is focused on a UI element associated with a second participant of the video conference. The determination is performed by either a client device of a video conference system or a video conference service implemented by one or more servers of a video conference system, based on the first participant focusing on a UI element associated with the second participant. However, in some implementations, a client device associated with the first participant (e.g., used by the first participant to connect to the video conference) performs the determination locally. The client device displays UI elements for the participants in the video conference and receives user input from the first participant indicating that they are focused on the UI element associated with the second participant. The client device then transmits information indicating that the first participant is focused on the UI element to the video conference system.

The client device can determine that the first participant is focused on the UI element using various techniques. In some implementations, the client device utilizes a camera to implement eye gaze tracking to determine an area of a display of the client device the first participant is focused on.

If the area of the display corresponds to a UI element associated with the second participant, the client device determines that the first participant is focused on the UI element associated with the second participant. In another implementations, the first participant can interact with a GUI of the client device to indicate a focus on the UI element associated with the second participant. For example, the first participant can hover a pointer over the UI element associated with the second participant, or, if using a touch interface, the first participant can press the UI element associated with the second participant.

In some implementations, a video conference service can determine that the first participant is focused on the UI element utilizing a video stream produced by a client camera to implement eye gaze tracking. The video conference service can use the eye gaze tracking to determine an area of a display of the client device the first participant is focused on. The client device can transmit information to the video conference service indicating where the UI elements are displayed on the display and if the area of the display corresponds to a UI element associated with the second participant, the video conference service makes the determination that the first participant is focused on the UI element associated with the second participant.

At 1404, the technique 1400 includes changing relative audio levels of communications for the second participant such that a first audio level for communications from the first participant to the second participant is higher than a second audio level for other communications received by the second participant responsive to the determining that the first participant of the video conference is focused on the UI element associated with the second participant of the video conference. The video conferencing system changes the relative audio levels for the second participant to accentuate the audio to inform the second participant that the first user is focused on their UI elements. The relative audio levels can be changed by different components of the video conference system depending on the implementation. For example, in a client-side implementation a client of the video conference system can change the relative audio levels when the client receives the audio. In a server-side implementations, a video conference service of a video conference system can change the relative audio levels prior to delivering an audio stream to the client.

In a server-side implementation, the relative audio levels can be changed by a video conference service of a video conference system based on information provided by a client device associated with the first participant. For example, the client device of the first participant may transmit data to the video conference service indicating that the communication is directed to the second participant. The video conference service can then change the relative audio levels and send the audio with the changed levels to a client device associated with the second user. In other implementations, the video conference service does not change the relative levels of the audio and instead causes such a change by transmitting the information provided by the client device associated with the first participant to a client device associated with the second participant. The client device associated with the second participant can then change the relative audio levels based on the information provided by the client device associated with the first participant.

At 1406, the technique 1400 includes causing a UI element associated with the first participant to change at a GUI displayed to the second participant. This portion of the technique 1400 can be performed in combination with changing the relative audio level performed at 1404, or independent of changing the relative audio levels. The client device of the second participant can alter the GUI to accentuate the UI element associated with the first participant to indicate that the first participant is directing communication to the second participant. For example, the client device associated with the second participant can utilize the information provided by the client device of the first participant to determine that the communication from the first participant should be accentuated and change the UI element in response.

The client device can accentuate the UI element associated with the first participant in a number of ways. In some implementations, the client device can change the appearance of the UI element by changing the colors, increasing the brightness, flashing the UI element, or surrounding the UI element with a colored border. In other implementations, the client device can change the appearance of the UI element by increasing the size of the UI element. Or, in some implementations, the client device can bring the UI element to the foreground of the graphical UI. The technique 1400 is not limited to any particular implementation and these implementations can be combined to further accentuate the UI element. For instance, the UI element could move to the foreground, flash, and grow in size.

At 1408, the technique 1400 optionally includes determining that the first participant is speaking. In some implementations, the video conference system may wait to accentuate the UI element associated with the first participant until the first participant begins to speak. This can help to avoid instances in which the first participant is focused on a UI element associated with the second participant but does not intend to send a directed communication to the second participant. The video conference system can determine that the first participant is speaking using techniques such as speech recognition, using the camera to detect that the first participant's mouth is moving, or measuring a volume level above a threshold.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining that a first participant of a video conference is focused on a user interface element associated with a second participant of the video conference; and
   responsive to the determining that the first participant is focused on the user interface element associated with the second participant, changing relative audio levels of communications for the second participant such that a first audio level for communications from the first participant to the second participant is higher than a second audio level for other communications received by the second participant when output at a client device of the second participant.

2. The method of claim 1, further comprising:
   determining that the first participant is no longer focused on the user interface element; and
   responsive to the determining that the first participant is no longer focused on the user interface element, restoring the relative audio levels of communications for the second participant to a third audio level that existed prior to the first participant focusing on the user interface element.

3. The method of claim 1, further comprising:
   responsive to the determining that the first participant is focused on the user interface element, causing a user interface element associated with the first participant to change at a graphical user interface displayed to the second participant while a user interface element associated with the first participant remains unchanged at graphical user interfaces displayed to participants of the video conference other than the second participant.

4. The method of claim 1, further comprising:
   determining that the first participant is speaking; and
   responsive to the determining that the first participant is focused on the user interface element and that the first participant is speaking, causing a user interface element associated with the first participant to change at a graphical user interface displayed to the second participant while a user interface element associated with the first participant remains unchanged at graphical user interfaces displayed to participants of the video conference other than the second participant.

5. The method of claim 1, wherein the user interface element is associated with a single participant.

6. The method of claim 1, wherein the user interface element is associated with a group of participants.

7. The method of claim 1, wherein determining that the first participant is focused on the user interface element is performed by identifying that a cursor associated with a pointing device is hovering over the user interface element.

8. The method of claim 1, further comprising:
   responsive to the determining that the first participant is focused on the user interface element, causing a user interface element associated with the first participant to transition from a background user interface element to a foreground user interface element while a user interface element associated with the first participant remains unchanged at graphical user interfaces displayed to participants of the video conference other than the second participant.

9. The method of claim 1, further comprising:
   determining that the first participant is speaking; and
   responsive to the determining that the first participant is focused on the user interface element and that the first participant is speaking, causing an audible alert for the second participant without causing an audible alert for other participants.

10. The method of claim 1, further comprising:
    prompting the first participant to confirm a focus on the user interface element; and
    responsive to a confirmation of the focus on the user interface element by the first participant, causing an alert for the second participant without causing an alert for other participants.

11. The method of claim 1, wherein changing the relative audio levels of communications is performed progressively over a period of time.

12. The method of claim 1, further comprising:
    determining that the first participant is focused on another user interface element associated with a third participant based on past interactions of the first participant with the third participant; and
    biasing a focus of the first participant based on the past interactions.

13. An apparatus, comprising:
    a memory; and
    a processor configured to execute instructions stored in the memory to:
      determine that a first participant of a video conference is focused on a user interface element associated with a second participant of the video conference; and responsive to the determining that the first participant is focused on the user interface element associated with the second participant, change relative audio levels of communications for the second participant such that a first audio level for communications from the first participant to the second participant is higher than a second audio level for other communications received by the second participant when output at a client device of the second participant.

14. The apparatus of claim 13, wherein to determine that the first participant of the video conference is focused on the user interface element associated with the second participant of the video conference comprises to:
identify that a cursor of a pointing device associated with the first participant is hovering over the user interface element.

15. The apparatus of claim 13, wherein the processor is further configured to execute instructions stored in the memory to:
causing a user interface element associated with the first participant to grow in size at a graphical user interface displayed to the second participant while a user interface element associated with the first participant remains unchanged at graphical user interfaces displayed to participants other than the second participant.

16. The apparatus of claim 13, wherein the processor is further configured to execute instructions stored in the memory to:
biasing a focus of the first participant based on past interactions of the first participant and the second participant.

17. A non-transitory computer-readable medium storing instructions operable to cause one or more processors to perform operations comprising:
determining that a first participant of a video conference is focused on a user interface element associated with a second participant of the video conference; and
responsive to the determining that the first participant is focused on the user interface element associated with the second participant, changing relative audio levels of communications for the second participant such that a first audio level for communications from the first participant to the second participant is higher than a second audio level for other communications received by the second participant when output at a client device of the second participant.

18. The non-transitory computer-readable medium of claim 17, wherein the instructions are further operable to cause the one or more processors to perform operations comprising:
responsive to the determining that the first participant is focused on the user interface element associated with the second participant, changing relative audio levels of communications for participants other than the second participant such that a third audio level for communications from the first participant to participants other than the second participant is lower than a fourth audio level for other communications received by the participants other than the second participant.

19. The non-transitory computer-readable medium of claim 17, wherein the instructions are further operable to cause the one or more processors to perform operations comprising:
responsive to the determining that the first participant is focused on the user interface element, causing a user interface element associated with the first participant to grow in size and transition from a background user interface element to a foreground user interface element while a user interface element associated with the first participant remains unchanged at graphical user interfaces displayed to participants other than the second participant.

20. The non-transitory computer-readable medium of claim 17, wherein the operations further comprise:
determining that the first participant is focused on another user interface element associated with a third participant based on past interactions of the first participant with the third participant; and
changing relative audio levels of communications for the third participant in response to determining that the first participant is focused on the other user interface.

* * * * *